Patented Feb. 17, 1953

2,628,919

UNITED STATES PATENT OFFICE 2,628,919

PRODUCTION OF TITANIUM DIOXIDE PIGMENTS

Charles A. Tanner, Jr., Collingswood, and Daniel C. Hall, Runnemede, N. J., assignors to American Cyanamid Company, New York, N. Y., a corporation of Maine No Drawing. Application December 22, 1949, Serial No. 134,606

6 Claims. (Cl. 106—300)

The present invention relates to an improved titanium dioxide pigment. It relates more particularly to a substantially salt-free titanium dioxide pigment which is especially well adapted, in addition to its suitability for the ordinary paint formulations, for use in water emulsion paint formulations and in the production of rubber, and the like uses.

In the present day commercial production of titanium dioxide pigment the product, subsequent to calcination, is ordinarily dry or wet milled to the desired particle size and is thereafter classified to eliminate the coarser particles which are unsuitable for pigment use. In the usual commercial production of these pigments, the milled pigment particles are classified by means of a centrifugal classifier. In this treatment the calcined titanium dioxide is dispersed in water, ground to the desired particle size, and passed into a centrifugal classifier where the smaller particles are separated from the undesirable large particles which are then reground and returned to the classifier. It has long been known that subsequent to the hydroclassification treatment, it is extremely difficult to filter the dispersed pigment particles. Consequently, the art has resorted to the use of various chemical flocculants in order to facilitate filtering of the classified pigment. The most commonly employed flocculants have been magnesium compounds such as magnesium sulfate, since these agents do not discolor the final product. The pigment so produced has been satisfactory for many of the uses to which such pigment is ordinarily put, but because of the relatively large amounts of occluded soluble salts (i. e., free cations such as magnesium ions or sorbed alkali metal salts) which are retained on the pigment particles due to the difficulty of removing them by commercial water washing treatments, the titanium dioxide pigments which have been marketed in the past have not been entirely satisfactory for use in various water paint emulsions and, additionally, in many uses wherein it is required that the pigment possess high electrical resistance properties.

We have discovered that titanium dioxide pigments which are substantially free of soluble salts, and in particular contain only traces of free polyvalent cations, may be prepared by employing barium compounds as flocculating agents for water dispersed titanium dioxide pigment particles.

It is therefore a principal object of the present invention to prepare titanium dioxide pigment which is substantially free of occluded water soluble salts. It is a further object of the invention to prepare titanium dioxide pigment which has improved electrical resistance characteristics and, consequently, a much wider field of use.

In the preparation of our improved titanium dioxide pigment, the practice of previous commercial operations may be employed up to and through the milling and classification treatments. At this point, however, we have found that it is advisable to carry out the wet treatments accorded to the pigment in the presence of water from which most of the soluble minerals and especially the polyvalent cations have been removed. It will be apparent that suitable water may be prepared by demineralization through the use of any of the commercially available ion exchange units, by distillation, or by any of the ordinary water softening treatments. The dispersed pigment particles may then be flocculated by dissolving in the mixture a relatively small amount of a barium compound. There is no particular limitation on the barium compounds which may be employed other than that they possess the necessary slight degree of water solubility. Subsequent to the flocculation treatment, the barium compounds may be precipitated as water-insoluble salts which do not impair the electrical resistance characteristics of the final product. An additional advantage to be derived from the use of barium compounds as pigment flocculating agents resides in the fact that the elimination of occluded water-soluble salts also greatly decreases the tendency of the pigment particles to form aggregates upon drying thereof. As a consequence, our improved titanium dioxide pigments have greatly improved texture properties and, in addition, improved color retention characteristics.

We have found that practically complete flocculation of water dispersed classified titanium dioxide is obtained by employing from about 0.5% to about 1.5% of the barium flocculant based on the weight of titanium dioxide in the dispersion. Although it is obvious that larger amounts of barium compound may be employed, it is not ordinarily of added advantage to do so. Among the barium compounds which have been found to be suitable as titanium dioxide flocculants are barium chloride, barium hydroxide, barium carbonate, barium acetate, barium iodide, barium formate, barium nitrate, and the like water-soluble barium compounds. The barium compounds may be employed at any point in the finishing treatment which is desirable. For example, if the pigment is both ground and classified in a dry condition, a washing and flocculating treatment may be resorted to thereafter. However, in most commercial finishing methods, the pigment is wet milled and hydroclassified. In such operations the barium flocculant may be added prior or subsequent to the wet milling operation.

The employment of barium flocculants according to the method of the present invention is also of commercial desirability since it does not interfere in any manner with the accepted finishing treatments accorded to commercial titanium dioxide pigment. For example, titanium dioxide pigment is often treated with small amounts of metal compounds such as aluminum, zinc and other metallic materials to improve the color, texture, and other physical properties of the pigment. It has been found that our barium flocculants may be used in conjunction with these metallic compounds in the finishing of titanium dioxide pigments and that the improvements hereinbefore described are equally as well obtained in such pigments.

In a specific embodiment of the invention, calcined titanium dioxide is dispersed in water to form a slurry having a $TiO_2$ content of from about 15–20% or more, and this slurry is fed to a centrifugal classifier. To the discharge is added about 0.5–1.25% of barium chloride based on the weight of the $TiO_2$. The composite is then heated to about 60–80° C. and maintained at this temperature until flocculation is substantially complete. Although the heating is not essential, it has been found to increase the speed of flocculation to an appreciable extent. Subsequent to flocculation the pH of the slurry is adjusted to substantial neutrality and the mixture is then filtered. Thereafter, the titanium dioxide is thoroughly washed with water which has been freed from most of its minerals in order to insure that the content of occluded salts on the final product will be kept at a minimum. The pigment is then dried at temperatures of about 100° C. to 150° C. and is thereafter pulverized to minimize aggregates in the final product. The pigment so prepared has a specific electrical resistance of at least 25,000 ohms and, in many instances, the resistance thereof is as great or greater than 65,000–67,000 ohms. The increase in specific electrical resistance over the improvement derived solely from the use of barium flocculants usually depends on the decrease in the content of water-soluble monovalent cations such as the alkali metals.

In determining the specific electrical resistance of our novel pigment, a sample weighing 20.7 g. is added to 180 ml. of distilled water in a weighed beaker. The mixture is then stirred thoroughly, heated to boiling and maintained at this temperature for 5 minutes. Thereafter, the mixture is cooled and sufficient additional water is added to bring the weight of the slurry to 200 g. The mixture is then cooled to 18° C. and the resistance is determined by means of a conductivity bridge. The specific resistance expressed in ohms is equal to the resistance value divided by the cell constant.

The texture values above referred to are based on an arbitrary method of evaluation in which the higher values represent a more uniform and desirable texture and a relatively complete absence of aggregates; a rating of 8 represents a desirable texture.

In any event, the specific electrical resistance of titanium dioxide, which has been freed from all but traces of water-soluble salts by the use of barium compounds, is much greater than that of the prior art commercial grades of $TiO_2$ pigment. This improvement, together with the accompanying improvements in texture and color retention characteristics imparts to our novel titanium dioxide pigment decided commercial desirability. It may be suitably employed in rubber formulation, water-emulsion paints, and in various fields where improved texture and electrical resistance are of great importance.

The invention will be illustrated in greater detail by the following specific examples. It should be understood, however, that although these examples may describe in detail certain specific features of the invention, they are given primarily for purposes of illustration and the invention in its broader aspects is not limited thereto.

*Example 1*

Calcined rutile $TiO_2$ was micropulverized and dispersed in demineralized water to obtain an aqueous slurry containing about 23% of $TiO_2$. NaOH was added to adjust the pH of the slurry to 10 to aid the dispersion of the $TiO_2$. The slurry was then passed through a commercial continuous centrifugal classifier after which over 99% of the classified particles were less than 4 microns in diameter, the rejects being returned to the system after being reground.

To a portion of the above described slurry containing 10,000 grams of $TiO_2$ was added 60 grams of $BaCl_2.2H_2O$ (0.6% based on the weight of $TiO_2$). The slurry was stirred for ½ hour, heated to 70° C. and held at this temperature for one hour, after which the pH was adjusted to 7.0 with sulfuric acid. The slurry was then dewatered on a vacuum filter and washed with demineralized water. The washed product was dried on a continuous belt conveyor drier at a temperature less than 130° C., after which the dried product was dry milled.

The product had a texture value of 6.5, a specific electrical resistance of 54,000 ohms, and a soluble salt content of 0.012%.

The above described procedure was repeated except that 60 grams of $MgSO_4.7H_2O$ was substituted for the $BaCl_2.2H_2O$. This product had a texture value of 5.5, a specific electrical resistance of 23,000 ohms, and a soluble salt content of 0.03%.

*Example 2*

Hydroclassified $TiO_2$ fines were prepared according to the procedure set forth in Example 1, except that the dispersion medium was softened water (polyvalent cations removed in an ion exchange unit, but containing sodium salts). To a slurry containing 500 g. of the hydroclassified $TiO_2$ (19.5% $TiO_2$ content) was added 6.25 g. (1.25%) of $BaCl_2.2H_2O$. The slurry was mixed and 3.0 g. (0.6%) of $Al_2(SO_4)_3.18H_2O$ was then added thereto. At this point the pH of the slurry was 3.5. The mixture was heated to 70° C., held at this temperature for one hour, and then neutralized to pH 7.0 with NaOH. The slurry was then dewatered and washed with 5 liters of distilled water. The product was dried at 110° C. and thereafter was dry milled. It had a texture value of 6.5, indicating substantially no aggregation on drying; the specific electrical resistance was 55,000 ohms; the soluble salt content was 0.012%.

Example 3

The procedure of Example 2 was repeated except that the treated neutral slurry was dewatered and then washed with water from which the polyvalent cations had been removed in an ion exchange unit. The product had a texture value of 6.5, a specific electrical resistance of 30,000 ohms, and a soluble salt content of 0.023%. The specific electrical resistance of this product was lower than that of Example 2 due to the fact that the material was washed with water containing sodium salts.

Example 4

The procedure of Example 2 was repeated except that 3 g. of $MgSO_4.7H_2O$ was used as the flocculant. The treated slurry was dewatered and washed according to the procedure of Example 3. The product had a texture value of 5.5, and specific electrical resistance of 21,000 ohms, and a soluble salt content of 0.034%. As is indicated by the lower texture value of 5.5 of this product, the use of $MgSO_4.7H_2O$ as the flocculating agent resulted in aggregation of the pigment during the drying procedure notwithstanding the fact that the same quantity and type of water was used as that employed in Example 3.

Example 5

Hydroclassified rutile fines were prepared from calcined rutile $TiO_2$ using a laboratory model International Centrifuge, size 1, type SB. To a portion of the fines fraction containing 500 g. of $TiO_2$ dispersed in demineralized water was added 6.25 g. of $BaCl_2.2H_2O$, the equivalent of 1.65 g. of $TiO_2$ as a solution of titanic sulfate, 1.65 g. of ZnO as zinc sulfate, and 5.0 g. of $$Al_2(SO_4)_3.18H_2O$$

The mixture was heated for one hour at 70° C. after which the pH was adjusted to 5.5 with $Na_2CO_3$ and then to 7.0 with NaOH. The neutral slurry was dewatered and washed with 5 liters of demineralized water. The washed product was dried at 110° C. and then dry milled. It had a texture value of 8, a specific electrical resistance of 27,000 ohms, and a soluble salt content of 0.026%.

Example 6

Hydroclassified rutile was prepared as in Example 5. To 500 g. of this $TiO_2$ dispersed in softened water was added 3.0 g. (0.6%) of $Ba(OH)_2.8H_2O$. The pH of this slurry was 11.0 and the mixture was adjusted to 7.0 with $H_2SO_4$. The slurry was then dewatered and washed with softened water and the product was dried and dry milled. The material produced had a texture value of 7.5, a specific electrical resistance of 36,000 ohms, and a soluble salt content of 0.019%.

Example 7

The procedure of Example 6 was repeated except that 4.0 g. of $BaCO_3$ was employed as the flocculant. After the addition of this agent the pH of the slurry was 10.4 and this was adjusted to 7.0 with $H_2SO_4$. The product was dewatered and washed with water which was substantially free of polyvalent cations. The final product had a texture value of slightly less than 8, a specific electrical resistance of 32,000 ohms, and a soluble salt content of 0.021%.

A control experiment was carried out similar to the above described procedure employing $MgSO_4.6H_2O$ as the flocculant. The product had a specific electrical resistance of only 18,000 ohms.

Example 8

2,000 g. of calcined rutile $TiO_2$, classified to less than 4 microns diameter was slurried with sufficient demineralized water to obtain a mixture of 1.13 specific gravity. To the mixture was added 120 ml. of an aqueous solution containing 100 g. per liter of $BaCl_2.2H_2O$ and 200 ml. of an aluminum chloride solution containing the equivalent of 100 g. per liter of $Al_2O_3$. The mixture was heated to 70° C. and maintained at this temperature for one hour. Thereafter the slurry was adjusted to a pH of 5.0 with soda ash and then was adjusted to 7.4 pH with NaOH. The slurry was then filtered, washed with demineralized water, dried, and micropulverized. The product had a specific electrical resistance of 67,000 ohms.

The above procedure was repeated employing 120 ml. of an aqueous solution containing 100 g. per liter of $MgSO_4.7H_2O$ and 400 ml. of an aluminum sulfate solution containing the equivalent of 50 g. per liter of $Al_2O_3$. The product had a specific electrical resistance of only 13,000 ohms.

We claim:

1. A method of producing a titanium dioxide pigment of improved electrical resistance and of improved texture, which comprises: wet milling and hydroclassifying an aqueous alkaline slurry of calcined titanium dioxide containing water-soluble salts to form an aqueous suspension of deflocculated titanium dioxide pigment particles; dissolving in said slurry at least sufficient of a water-soluble barium compound to flocculate said particles in said slurry; adjusting the pH of the flocculated slurry to substantial neutrality; filtering said slurry; washing the filter cake with a water substantially free from polyvalent metal cations until the specific electrical resistance of the titanium dioxide is at least 25,000 ohms; and drying and pulverizing the filter cake.

2. A method according to claim 1, wherein the barium compound is barium chloride.

3. A method according to claim 1, wherein the slurry is heated to between about 60° C. and 80° C. during the flocculation.

4. A method according to claim 1, wherein about 0.4% to about 0.7% of a water-soluble aluminum compound, based on the weight of the titanium dioxide, is dissolved in the slurry subsequent to the addition of the barium compound.

5. A method according to claim 4, wherein the aluminum compound is aluminum sulfate.

6. A method according to claim 4, wherein the water substantially free from polyvalent metal cations is distilled water.

CHARLES A. TANNER, JR.
DANIEL C. HALL.

REFERENCES CITED

The following references are of record in the file of this patent:

UNITED STATES PATENTS

| Number | Name | Date |
| --- | --- | --- |
| Re. 16,956 | Blumenfeld | May 8, 1928 |
| 1,876,088 | Stephens | Sept. 6, 1932 |
| 2,084,917 | Nelson | June 22, 1937 |
| 2,378,148 | McKinney | June 12, 1945 |